United States Patent
Kurihara et al.

(10) Patent No.: US 11,927,517 B2
(45) Date of Patent: Mar. 12, 2024

(54) RESONANCE SHEAR MEASUREMENT DEVICE

(71) Applicant: TOHOKU UNIVERSITY, Sendai (JP)

(72) Inventors: Kazue Kurihara, Sendai (JP); Masashi Mizukami, Sendai (JP); Motohiro Kasuya, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 361 days.

(21) Appl. No.: 17/593,222

(22) PCT Filed: Mar. 28, 2019

(86) PCT No.: PCT/JP2019/013845
§ 371 (c)(1),
(2) Date: Sep. 13, 2021

(87) PCT Pub. No.: WO2020/194734
PCT Pub. Date: Oct. 1, 2020

(65) Prior Publication Data
US 2022/0155202 A1    May 19, 2022

(51) Int. Cl.
*G01N 11/16*     (2006.01)
*G01N 3/24*      (2006.01)

(52) U.S. Cl.
CPC .............. *G01N 11/16* (2013.01); *G01N 3/24* (2013.01); *G01N 2203/0094* (2013.01)

(58) Field of Classification Search
CPC ........... G01N 11/16; G01N 2203/0007; G01N 2203/0094; G01N 2291/02818;
(Continued)

(56) References Cited

U.S. PATENT DOCUMENTS

| 5,094,100 A * | 3/1992 | Dealy | G01N 11/10 73/54.01 |
| 5,705,738 A * | 1/1998 | Kurihara | G01N 13/00 73/54.39 |

(Continued)

FOREIGN PATENT DOCUMENTS

| EP | 1942331 | 7/2008 | |
| EP | 1942331 A1 * | 7/2008 | ............. G01N 19/04 |

(Continued)

OTHER PUBLICATIONS

"International Application Serial No. PCT/JP2019/013845, International Search Report dated Jun. 18, 2019", w/ English Translation, (Jun. 18, 2019), 5 pgs.

(Continued)

*Primary Examiner* — Andre J Allen
(74) *Attorney, Agent, or Firm* — Schwegman Lundberg & Woessner, P.A.

(57) ABSTRACT

A resonance shear measurement device (1) of the present invention includes an upper unit (10) having a piezoelectric element (15), an upper disk substrate (16), and a spring (17), and a lower unit (11) having a lower disk substrate (14), in which a sample insertion portion (21) is formed between a lower surface of the upper disk substrate (16) and an upper surface of the lower disk substrate (14), the piezoelectric element (15) and the upper disk substrate (16) are vibratably connected to a fixed apparatus 30 via the spring (17), a strain gauge (19) is attached to the spring (17), and by applying an AC voltage to the piezoelectric element (15) while changing a frequency of the AC voltage, a response voltage at the resonance from the strain gauge (19) due to a vibration of the upper unit (10) is measured.

4 Claims, 5 Drawing Sheets

(58) Field of Classification Search
CPC ....... G01N 2291/02827; G01N 29/022; G01N 29/036; G01N 3/24; G01N 3/32
See application file for complete search history.

(56) References Cited

U.S. PATENT DOCUMENTS

| | | |
|---|---|---|
| 2009/0145231 A1 | 6/2009 | Kurihara et al. |
| 2016/0274015 A1 | 9/2016 | Hadj Henni et al. |

FOREIGN PATENT DOCUMENTS

| | | |
|---|---|---|
| JP | 53124450 U | 10/1978 |
| JP | 02093302 A | 4/1990 |
| JP | 2009058340 A | 3/2009 |
| JP | 4615568 B | 1/2011 |
| JP | 2014038108 | 2/2014 |
| JP | 6330212 B | 5/2018 |
| WO | WO-2007037241 A1 | 4/2007 |

OTHER PUBLICATIONS

"International Application Serial No. PCT/JP2019/013845, Written Opinion dated Jun. 18, 2019", (Jun. 18, 2019), 4 pgs.

Mizukami, Masashi, et al., "Resonance Shear Measurement on Nano-Confined Liquids and Friction Analysis, Special Issue of "Progress in In-situ Measurement of Friction Interface"", Hyomen Kagaku, 2017, vol. 38, No. 3, (2017), pp. 117-122.

Shibazaki, Shogo, et al., "Resonance shear measurement on lubrication properties of engine oils: Effects of additives", Toraibarojisuto/Journal of Japanese Society of Tribologists 63.4, (2018), pp. 284-293.

"Japanese Application Serial No. 2021-508656, Office Action dated Jan. 25, 2022", (Jan. 25, 2022), 4 pgs.

"European Application Serial No. 19921673.0, European Search Report dated Oct. 14, 2022", (Oct. 14, 2022), 9 pgs.

Dhiman, Pradeep Kumar, "Strain Gauge Based Displacement Sensor", XP055968693, Retrieved from the Internet: URL:https: citeseerx.ist.psu.edu viewdoc download?doi=10.1.1.535.8496andrep=rep1andtype=pdf[retrieved on Oct. 6, 2022], (Dec. 30, 2006), 164-166.

* cited by examiner

RESONANCE SHEAR MEASUREMENT DEVICE

PRIORITY APPLICATIONS

This application is a U.S. National Stage Filing under 35 U.S.C. § 371 from International Application No. PCT/JP2019/013845, filed on Mar. 28, 2019, and published as WO2020/194734 on Oct. 1, 2020; the benefit of priority of which is hereby claimed herein, and which application and publication is hereby incorporated herein by reference in its entirety.

TECHNICAL FIELD

The present invention relates to a resonance shear measurement device.

BACKGROUND ART

The inventor of the present application has developed and proposed a resonance shear measurement method of measuring the resonance shear curve of a vibration system by vibrating one surface fixed to a spring in a sinusoidal manner and sweeping a frequency (Patent Documents 1 and 2, Non-Patent Document 1).

Figure 6:
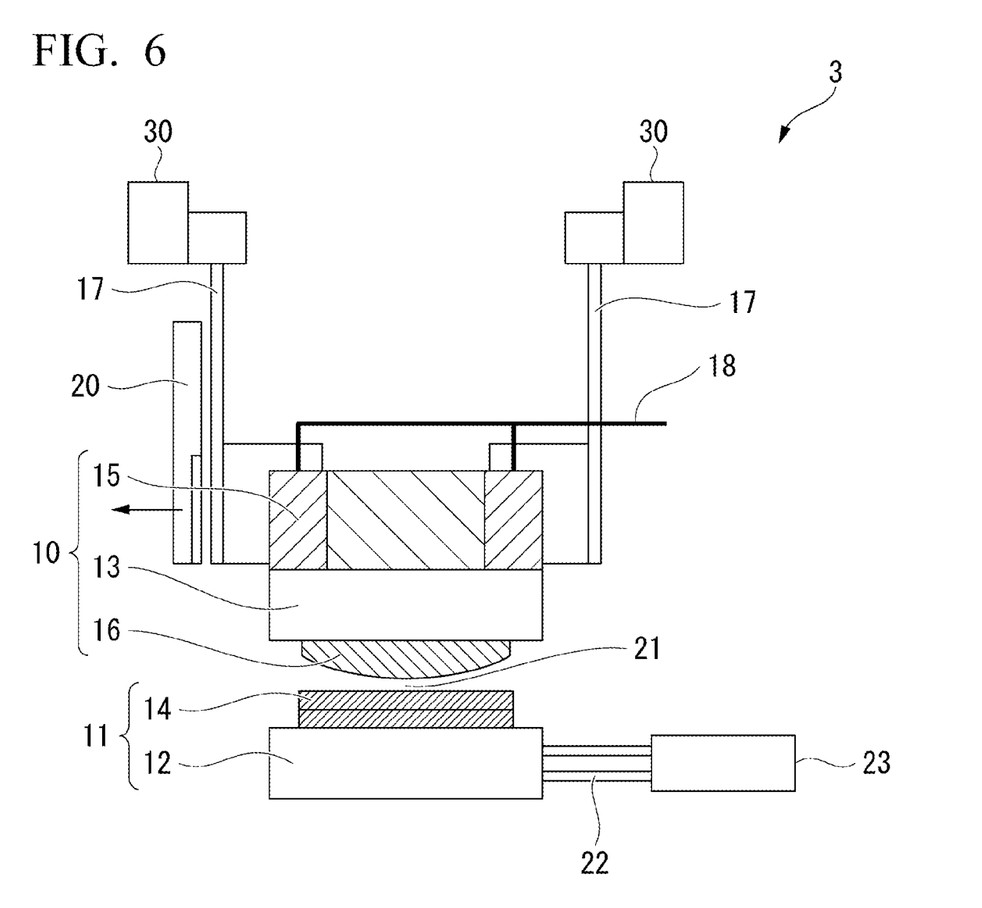
FIG. 6 is a schematic configuration diagram showing the resonance shear measurement device 3 of the related art.

FIG. 6 is a schematic configuration diagram showing a resonance portion of a resonance shear measurement device of the related art (Non-Patent Document 1). A resonance shear measurement device 3 shown in FIG. 6 includes an upper unit 10 having a piezoelectric element 15, an upper disk substrate 16, and a spring 17, and a lower unit 11 having a lower disk substrate 14, and a film-shaped sample insertion portion 21 is formed between a lower surface of the upper disk substrate 16 and an upper surface of the lower disk substrate 14. The piezoelectric element 15 and the upper disk substrate 16 are vibratably connected to a fixed apparatus 30 via the spring 17. By inserting a sample such as a solid, liquid, or liquid crystal into the sample insertion portion 21 and applying an AC voltage to the piezoelectric element 15 while changing a frequency of the AC voltage, the shear deformation to the sample between solid surfaces is induced. By applying a sinusoidal AC voltage to the piezoelectric element 15 in accordance with a frequency range including a resonance frequency of the upper unit 10, from a response voltage of the capacitance probe 20, a vibration of the upper unit 10, that is, a horizontal displacement of the spring 17 is measured in a non-contact manner to measure a resonance shear curve. Accordingly, a viscoelastic term and friction/lubrication characteristics of the sample between the solid surfaces can be accurately measured.

CITATION LIST

Patent Documents

[Patent Document 1]
    Japanese Patent No. 4615568
[Patent Document 2]
    Japanese Patent No. 6330212

Non Patent Document

[Non Patent Document 1]
    Shogo Shibasaki, et al. 5, "Resonance Shear Measurement on Lubrication Properties of Engine Oils: Effects of Additives", Tribologist, Feb. 6, 2018, Vol. 63, No. 4, p 284-293

SUMMARY OF INVENTION

Technical Problem

However, in the resonance shear measurement device 3 of the related art in which a capacitance probe 20 measures a horizontal displacement of a spring 17, there is a disadvantage that the capacitance probe 20 should be installed with an accurate distance between the capacitance probe 20 and the spring 17, and the distance should be controlled with high precision. In addition, the capacitance probe 20 capable of measuring displacement at a nanometer level is expensive. Further, in order to measure a volatile sample or control a pressure in the apparatus, it is necessary to provide a large closed unit or a control unit including the capacitance probe 20, which is difficult.

Therefore, an object of the present invention is to provide a resonance shear measurement device capable of easily measuring a resonance shear behavior, compactly and easily providing a closed unit, and reducing a manufacturing cost.

Solution to Problem

The present invention has the following configuration.

[1] A resonance shear measurement device including: an upper unit having a piezoelectric element, an upper disk substrate, and a spring; and a lower unit having a lower disk substrate, in which a sample insertion portion is formed between a lower surface of the upper disk substrate and an upper surface of the lower disk substrate, the piezoelectric element and the upper disk substrate are vibratably connected to a fixed apparatus via the spring, a strain gauge is attached to the spring, and a response voltage at the resonance from the strain gauge due to a vibration of the upper unit is measured by applying an AC voltage to the piezoelectric element while changing a frequency of the AC voltage.

[2] The resonance shear measurement device according to [1], further including an information processing unit electrically connected to the piezoelectric element, in which the strain gauge is electrically connected to the information processing unit, and the information processing unit measures the response voltage at the resonance from the strain gauge due to the vibration of the upper unit by applying the AC voltage to the piezoelectric element while changing the frequency of the AC voltage.

[3] The resonance shear measurement device according to [1] or [2], in which viscoelasticity of a sample inserted into the sample insertion portion is measured based on an amplitude of the AC voltage at the resonance and an amplitude of the response voltage at the resonance.

[4] The resonance shear measurement device [3], in which the viscoelasticity of the sample inserted into the sample insertion portion is obtained by a physical model analysis based on a resonance shear curve obtained from the amplitude of the AC voltage and the amplitude of the response voltage with respect to the frequency.

Advantageous Effects of Invention

The resonance shear measurement device of the present invention can easily measure a resonance shear behavior, can easily provide a closed unit compactly, and can reduce a manufacturing cost.

DESCRIPTION OF EMBODIMENTS

Hereinafter, a resonance shear measurement device according to an embodiment of the present invention will be described with reference to the drawings.

In addition, in the drawings used in the following description, in order to make it easy to understand features of the present invention, a main portion may be enlarged for convenience, and a dimensional ratio or the like of each component is not always the same as the actual one.

Embodiment

Figure 1:
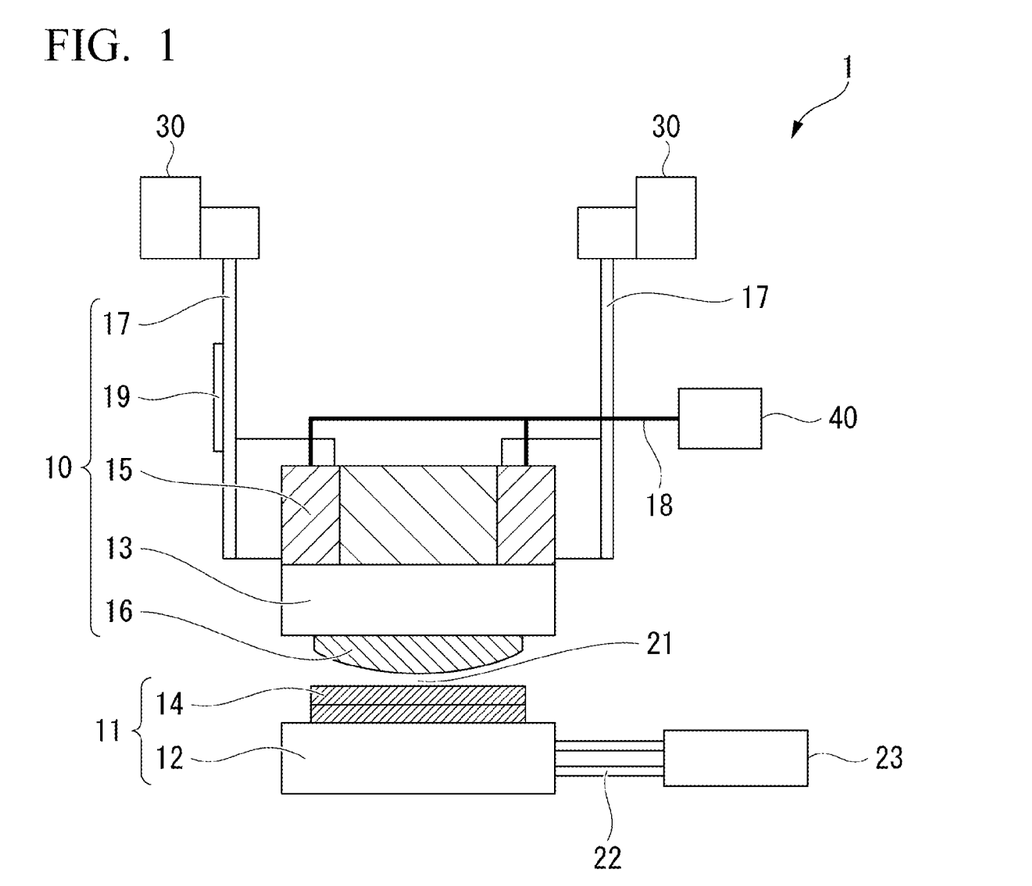
FIG. 1 is a schematic configuration diagram showing a resonance shear measurement device 1 according to an embodiment of the present invention.

FIG. 1 is a schematic configuration diagram showing a resonance shear measurement device 1 according to the embodiment of the present invention.

The resonance shear measurement device 1 of the present embodiment includes an upper unit 10 having a piezoelectric element 15, an upper disk holder 13, an upper disk substrate 16, and a spring 17, and a lower unit 11 having a lower disk substrate 14 and a lower disk holder 12. A sample insertion portion 21 is formed between a lower surface of the upper disk substrate 16 and an upper surface of the lower disk substrate 14, the piezoelectric element 15, the upper disk holder 13, and the upper disk substrate 16 are vibratably connected to a fixed apparatus 30 via a spring 17, and a strain gauge 19 is attached to the spring 17.

By applying a sinusoidal AC voltage to the piezoelectric element 15 in accordance with a frequency range including a resonance frequency of the upper unit 10 while changing a frequency of the AC voltage, a response voltage at the resonance from the strain gauge 19 due to a vibration of the upper unit 10 is measured. As a result, a resonance shear curve of the upper unit 10 can be obtained.

In the resonance shear measurement device 1, the strain gauge 19 is attached to the plate-shaped spring 17. Accordingly, unlike a capacitance probe 20 of the resonance shear measurement device 3 of the related art that measures a horizontal displacement of the spring 17, it is not necessary to install the capacitance probe 20 and the spring 17 at a precise distance, and a sensor unit including the strain gauge 19 can be compactly accommodated. Since the upper unit and the lower unit are installed in a sealed container and the strain gauge 19 is attached to the spring 17, the closed unit can be easily and compactly installed, and it is possible to control a pressure in the device. A manufacturing cost can be reduced by using an inexpensive strain gauge 19, and a resonance shear behavior when the upper unit 10 is vibrated can be measured more easily.

The sample insertion portion refers to a space between the lower surface of the upper disk substrate 16 and the upper surface of the lower disk substrate 14 into which a sample can be inserted.

The spring 17 suspends the piezoelectric element 15 and the upper disk substrate 16 from the fixed apparatus 30. The spring 17 is a pair of vertically provided plate-shaped springs capable of vibrating the piezoelectric element 15 and the upper disk substrate 16 in a horizontal direction, and is disposed substantially perpendicular to both surfaces of the film-shaped sample insertion portion 21, that is, the lower surface of the upper disk substrate 16 and the upper surface of the lower disk substrate 14.

In general, a spring constant of the spring 17 is about 1000 N/m, but is appropriately set according to an amplitude of the vibration of the upper unit 10 and properties of a sample to be measured and is not limited thereto.

The lower surface of the upper disk substrate 16 and the upper surface of the lower disk substrate 14 come into direct contact with a measurement sample. In this embodiment, a mica sheet having a thickness of about 3 μm is used on the lower surface side of the upper disk substrate 16 and the upper surface side of the lower disk substrate 14. A spherical surface, a flat surface, a cylindrical surface, or the like is used for the lower surface of the upper disk substrate 16 and the upper surface of the lower disk substrate 14. The upper disk substrate 16 and the lower disk substrate 14 may be flat plates, but it is not always easy to install the flat plates in parallel. In the resonance shear measurement device 1 of the present embodiment, for ease of attachment, a combination is selected in which the lower surface of the upper disk substrate 16 and the upper surface of the lower disk substrate 14 are side surfaces of a cylinder, and two semi-cylinders are disposed orthogonally to each other.

Various materials such as metal, ceramics, and polymers can be used on the lower surface side of the upper disk substrate 16 and the upper surface side of the lower disk substrate 14, and are not limited to mica. Further, in the resonance shear measurement device 1 of the present embodiment, a cleaved mica sheet is attached to a semi-cylindrical quartz lens (curvature radius R=20 mm) with an epoxy resin to form the upper disk substrate 16 and the lower disk substrate 14, and two semi-cylinders of the upper disk substrate 16 and the lower disk substrate 14 are disposed orthogonally to each other. A spherical surface, a flat surface, a cylindrical surface, or the like is used for the lower surface of the upper disk substrate 16 and the upper surface of the lower disk substrate 14. The upper disk substrate 16 and the lower disk substrate 14 may be flat plates, but it is not always easy to install the flat plates in parallel. From the viewpoint of ease of attachment, a combination in which the lower surface of the upper disk substrate 16 is a spherical surface and the upper surface of the lower disk substrate 14 is a flat surface is selected. Further, from the viewpoint that accurate measurement can be easily performed, it is preferable that two semi-cylinders are disposed orthogonally to each other as the upper disk substrate 16 and the lower disk substrate 14.

The piezoelectric element 15 is a piezoelectric element constituted by a four-sectored piezo tube in which an outer electrode is divided into four, and can vibrate the upper unit 10 having the upper disk substrate 16 right and left by applying a voltage having an appropriate amplitude and frequency to an opposing electrode and an inner electrode. In this case, a trace sample such as a solid, a liquid, or a liquid crystal is interposed in the sample insertion portion 21, and a sinusoidal AC voltage is applied to the piezoelectric element 15 in accordance with the peripheral frequency including the resonance frequency of the upper unit 10. Accordingly, the trace sample is displaced and deformed, the upper unit 10 is vibrated right and left, and a resonance shear curve is obtained by measuring the magnitude of this amplitude with the strain gauge 19 attached to the spring 17 by changing the frequency of the AC voltage (that is, the applied voltage).

The sample insertion portion 21 is the space interposed between the lower surface of the upper disk substrate 16 and the upper surface of the lower disk substrate 14, and has a substantial film shape. An inter-surface distance between the lower surface of the upper disk substrate 16 and the upper surface of the lower disk substrate 14 can be appropriately set, for example, in the range of 0 nm to 2 mm according to the purpose of the resonance shear measurement. The inter-surface distance between the surfaces is defined as a distance between the closest portions of the upper and lower surfaces between a plane and a spherical surface and semi-cylindrical surfaces orthogonal to each other.

For the purpose of evaluating lubricity of a liquid between solid surfaces, an inter-surface distance between the lower surface of the upper disk substrate 16 and the upper surface of the lower disk substrate 14 is, for example, in a range of 0.1 nm to 100 nm, preferably 0.1 nm to 60 nm, and more preferably 0.1 nm to 40 nm.

It is preferable that the inter-surface distance between the lower surface of the upper disk substrate 16 and the upper surface of the lower disk substrate 14 can be finely adjusted in a state where the sample is interposed the sample insertion portion 21. It is preferable that the inter-surface distance between the lower surface of the upper disk substrate 16 and the upper surface of the lower disk substrate 14 can be set to 0 nm, that is, in a contact state for the control test.

For the purpose of measuring viscoelasticity of a liquid sample, an inter-surface distance between the lower surface of the upper disk substrate 16 and the upper surface of the lower disk substrate 14 is, for example, in a range of 20 nm to 2 mm, preferably 50 nm to 1000 μm, and more preferably 100 nm to 500 μm. Also in this case, it is preferable that the inter-surface distance between the lower surface of the upper disk substrate 16 and the upper surface of the lower disk substrate 14 can be set to 0 nm, that is, in a contact state for the control test.

A required sample amount can be reduced by narrowing the inter-surface distance between the lower surface of the upper disk substrate 16 and the upper surface of the lower disk substrate 14. For example, a typical required sample amount of a commercially available viscometer of the related art is several mL, and even a viscometer capable of measuring a small amount is at least 100 μL. However, in the resonance shear measurement device 1 of the present embodiment, the required sample amount is 20 μL or more.

The resonance shear measurement device 1 further includes an information processing unit 40 electrically connected to the piezoelectric element 15. The strain gauge 19 is also electrically connected to the information processing unit 40. The information processing unit 40 is configured to measure the response voltage at the resonance from the strain gauge 19 due to the vibration of the upper unit 10 by applying a sinusoidal AC voltage to the piezoelectric element 15 while changing the frequency of the AC voltage.

The information processing unit 40 as driving means of the piezoelectric element 15 applies the AC voltage to the piezoelectric element 15 and detects a response voltage from the strain gauge 19. The information processing unit 40 can detect an amplitude $U_{out}$ of the response voltage together with an amplitude $U_{in}$ of the AC voltage (that is, applied voltage). It is also possible to obtain the resonance shear curve by Fourier transforming an attenuation curve of the amplitude $U_{out}$. By measuring the amplitude $U_{out}$ of the response voltage together with a change in the inter-surface distance, the attenuation curve of the amplitude $U_{out}$ can be Fourier transformed to obtain the resonance shear curve.

The resonance shear measurement device 1 can measure the viscoelastic term of the sample inserted into the sample insertion portion 21 based on the amplitude of the AC voltage (that is, the applied voltage) at the resonance and the amplitude of the response voltage at the resonance, as shown in Examples described later.

The resonance shear measurement device 1 can measure the viscoelastic term of the sample inserted into the sample insertion portion 21 based on the resonance shear curve obtained from the amplitude of the AC voltage (that is, the applied voltage) and the amplitude of the response voltage with respect to the frequency, as shown in Examples described later.

In the lower unit 11 of the resonance shear measurement device 1, the lower disk substrate 14 is fixed to the lower disk holder 12, and the lower disk holder 12 is connected to a horizontal spring 22. The horizontal spring 22 acts as a cantilever for measuring a normal force, and has a configuration capable of controlling a vertical displacement of the lower disk substrate 14.

That is, the lower unit 11 is connected to a micro drive system 23 including a pulse motor and a differential spring via two horizontal springs 22, and an inter-surface distance (D) between the lower surface of the upper disk substrate 16 and the upper surface of the lower disk substrate 14 can be controlled with a resolution of 1 nm or less.

Further, in the resonance shear measurement device 1, the inter-surface distance (D) can be determined with a resolution of 0.1 nm from an analysis of Fringes of Equal Chromatic Order (FECO) caused by multiple reflections of white light vertically incident on the surface between silver-deposited surfaces. Bending of the horizontal spring 22 is determined as the difference (ΔD) between a "driving distance" by the pulse motor and the "change in the inter-surface distance", and a load (L) is obtained by multiplying a spring constant (K) of the horizontal spring 22 (L=KΔD). In addition to this, ΔD and L can also be determined by using a twin-path method, which is a distance determination method by an interferometer using reflected light from the lower surface of the lower unit.

As the upper unit 10, the upper disk substrate 16 is fixed to the piezoelectric element 15 constituted by a four-sectored piezo tube via the upper disk holder 13. Further, the upper disk substrate 16 and the upper disk holder 13 are connected to the two springs 17 via the piezoelectric element 15. Antiphase sinusoidal waveform voltages (amplitude $U_{in}$, frequency f) are applied to two opposing electrodes of the four-sectored piezo tube to vibrate the lower surface of the upper disk substrate 16 in the horizontal direction, and thus, a vibration displacement (Δx) of a tip of the spring 17 can be measured as the output voltage $U_{out}$ by the strain gauge 19. An angular frequency ω (=2π(f)) is swept and the output voltage $U_{out}$ is measured to obtain the resonance shear curve ($U_{out}/U_{in}$ vs ω). In the air, in a state where the lower surface of the upper disk substrate 16 and the upper surface of the lower disk substrate 14 are separated from each other (separation in air, Air Separation (AS)), a resonance peak is observed at the frequency ($ω_{AS}$) determined by a mass ($m_1$) of the upper unit 10 and a spring constant ($k_1$).

In a non-slip state (Solid Contact (SC)) in which the lower surface of the upper disk substrate 16 and the upper surface of the lower disk substrate 14 are in contact with each other in air, a mass ($m_2$) of the lower unit 11 including the lower disk substrate 14, the lower disk holder 12 and the horizontal spring 22 and a lateral spring constant ($k_3$) of the horizontal spring 22 are added to the upper unit 10, and the resonance peak is shifted to a higher frequency ($ω_{sc}$). The AS peak and the SC peak each correspond to the non-friction state and the non-slip state. With reference to these peaks, the characteristics of the liquid sample can be evaluated by the amplitude and frequency of the resonance peak measured in a state where the liquid sample is interposed between the sample insertion portion 21 between the lower surface of the upper disk substrate 16 and the upper surface of the lower disk substrate 14. Typically, the AS peak frequency WAS is observed around 195 rad/s (31 Hz), and the SC peak frequency $ω_{sc}$ is observed around 350 rad/s (56 Hz). However, since the resonance peak may change for each setting, the AS peak and the SC peak are measured for each setting.

(Physical Model Analysis of Resonance Shear Curve)

Figure 2:
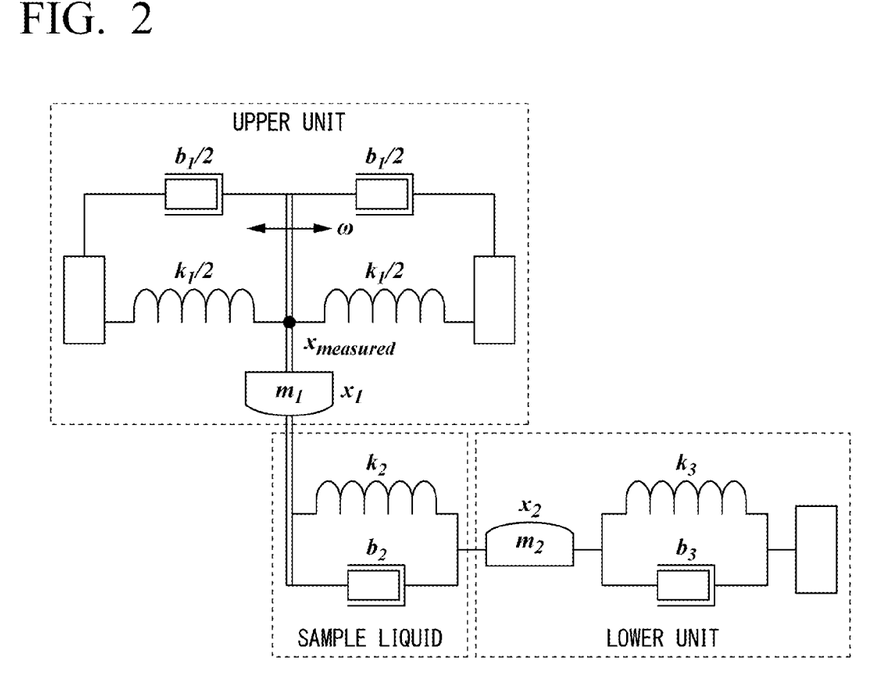
FIG. 2 is a schematic view showing a physical model used for analysis of a resonance shear curve of the resonance shear measurement device 1 shown in FIG. 1.

FIG. 2 is a schematic view showing a physical model of the resonance shear measurement device 1 shown in FIG. 1 used for analyzing the resonance shear curve. A viscosity term $b_1$, an elasticity term $k_1$, and an effective mass $m_1$ are considered as parameters of the upper unit 10. A viscosity term $b_2$ and an elasticity term $k_2$ are considered as a sample liquid portion. A viscosity term $b_3$, an elasticity term $k_3$, and an effective mass $m_2$ are considered as parameters of the lower unit 11. Using these parameters, equations of motion of the lower surface of the upper disk substrate 16 and the upper surface of the lower disk substrate 14 can be expressed as follows.

$$m_1 \frac{d^2 x_1}{dt^2} + k_1 \frac{x_1}{\alpha} + k_2(x_1 - x_2) + \frac{b_1}{\alpha} \frac{dx_1}{dt} + b_2 \frac{d}{dt}(x_1 - x_2) = F\exp(i\omega t) \quad (1)$$

$$m_2 \frac{d^2 x_2}{dt^2} + k_2(x_2 - x_1) + k_3 x_2 + b_2 \frac{d}{dt}(x_2 - x_1) + b_3 \frac{dx_2}{dt} = 0 \quad (2)$$

Here, $x_1$ is a horizontal displacement of the lower surface of the upper disk substrate 16, $x_2$ is a horizontal displacement of the upper surface of the lower disk substrate 14, and α is measured by $x_1$ and the strain gauge 19. A parameter ($α_d$) relates x1 to $x_{measured}$, a displacement of the plate-shaped spring 17 provided in the vertical direction, to be x1=α$x_{measured}$). Fexp (iωt) represents an external force from the piezoelectric element 15. By solving simultaneous differential equations of Expressions (1) and (2) with stationary solutions of $x_1$ and $x_2$ as $x_1=X_1 \exp(i\omega t+\varphi_1)$ and $x_2=X_2 \exp(i\omega t+\varphi_2)$, amplitudes ($X_1$, $X_2$) and an analytical solution of a phase term ($\varphi_1$, $\varphi_2$) can be obtained. From the solution of $X_1$, a theoretical formula of the resonance shear curve ($U_{out}/U_{in}$ vs ω) is expressed as follows.

$$\frac{U_{out}}{U_{in}} = \frac{C}{\alpha} \sqrt{\frac{(K_2 - m_2\omega^2)^2 + \omega^2 B_2^2}{[(K_1 - m_1\omega^2)(K_2 - m_2\omega^2) - \omega^2 B_1 B_2 - k_2^2 + b_2^2\omega^2]^2 + \omega^2[(K_1 - m_1\omega^2)B_2 + (K_2 - m_2\omega^2)B_1 - 2k_2 b_2]^2}} \quad (3)$$

Here, $B_1=b_1/\alpha+b_2$, $B_2=b_2+b_3$, $K_1=k_1/\alpha+k_2$, $K_2=k_2+k_3$. Here, α is fixed to α=1 obtained by actual measurement. For $m_1$, a measured value of the mass of the upper unit is used. By setting $b_2$, $k_2$, $b_3$, $k_3$, and $m_2$ in Expression (3) to zero, the resonance shear curve of the air separation (AS) is fitted, and the parameters $k_1$ and $b_1$ of the upper unit 10 are determined.

Further, the resonance shear curve of the solid contact (SC) is fitted by Expression in which the term of the parameter ($k_2$, $b_2$) of the sample portion in Expression (3) is eliminated by setting $x_1=x_2$, and the parameters $b_3$ and $k_3$ of the lower unit 11 are determined. The parameters ($b_2$, $k_2$) of the sample portion are determined by fitting the resonance shear curve measured in the state where the sample is interposed between the sample insertion portion 21 between the lower surface of the upper disk substrate 16 and the upper surface of the lower disk substrate 14. A device constant C can be determined by fitting the resonance shear curves of the lower unit 11's non-contributory air separation (AS) and the lower unit 11's contributory solid contact (SC).

A relationship between the viscosity parameter $b_2$ (Ns/m) and the viscosity η (N/m²·s) is represented by $b_2=\eta A/D$ (A: shear area, D: inter-surface distance between lower surface of upper disk substrate 16 and upper surface of lower disk substrate 14).

EXAMPLES

Hereinafter, the present invention will be described in more detail with reference to Examples or the like, but the scope of the present invention is not limited to the Examples or the like.

Comparative Example 1

Figure 3:
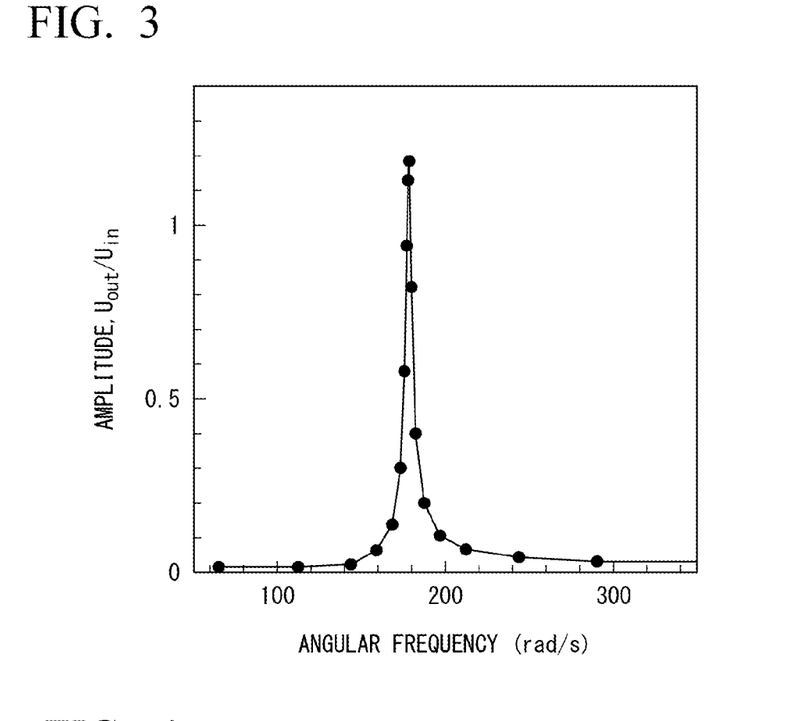
FIG. 3 is a graph showing a ratio (vertical axis) of (amplitude $U_{out}$ of response voltage)/(amplitude $U_{in}$ of applied voltage) with respect to a frequency (horizontal axis) of an AC voltage (that is, applied voltage) and a measurement is performed using a resonance shear measurement device 3 having a capacitance probe 20 as displacement measurement means.

Using a resonance shear measurement device 3 of the related art shown in FIG. 6 including a capacitance probe 20 as displacement measurement means, a sinusoidal AC voltage was applied to the piezoelectric element 15 while changing the frequency of the AC voltage in air, and the response voltage from the capacitance probe 20 due to the vibration of the upper unit 10 was measured. FIG. 3 is a graph showing a ratio (vertical axis) of (amplitude $U_{out}$ of response voltage)/(amplitude $U_{in}$ of applied voltage) with respect to the frequency (horizontal axis) of the AC voltage (that is, applied voltage). It can be seen that the resonance shear curve of the upper unit 10 is measured.

Example 1

(Measurement of Resonance Shear Curve in State (AS) in which Lower Surface of Upper Disk Substrate 16 and Upper Surface of Lower Disk Substrate 14 are Separated in Air)

Figure 4:
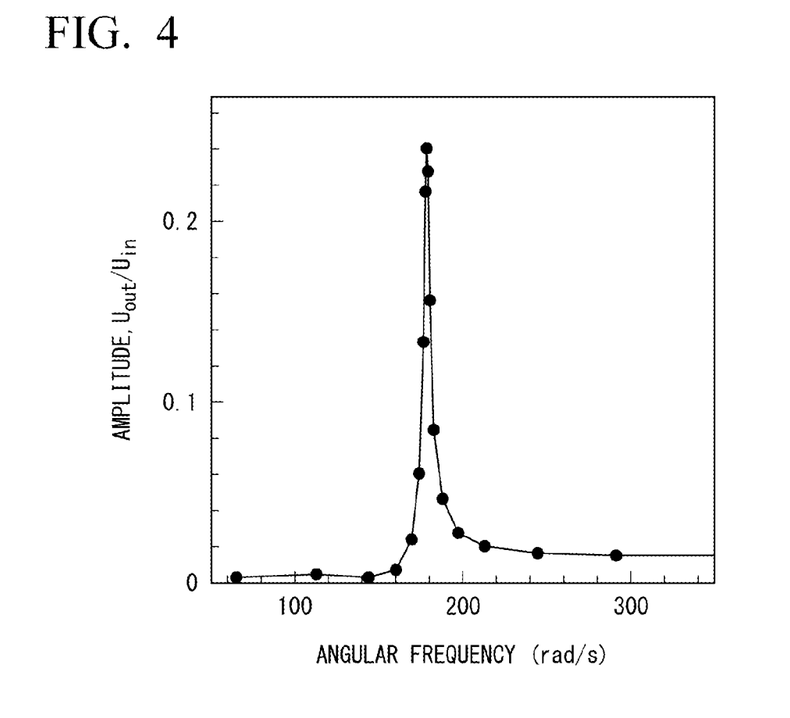
FIG. 4 is a graph showing a ratio (vertical axis) of (amplitude $U_{out}$ of response voltage)/(amplitude $U_{in}$ of applied voltage) with respect to the frequency (horizontal axis) of the AC voltage (that is, applied voltage) and a measurement is performed using a resonance shear measurement device 2 having a strain gauge 19 as the displacement measurement means.

Using the resonance shear measurement device 1 of the present embodiment shown in FIG. 1 including the strain gauge 19 as the displacement measurement means, a sinusoidal AC voltage was applied to the piezoelectric element 15 while changing the frequency of the AC voltage in air, and the response voltage from the strain gauge 19 due to the vibration of the upper unit 10 was measured. FIG. 4 is a graph showing a ratio (vertical axis) of (amplitude $U_{out}$ of response voltage)/(amplitude $U_{in}$ of applied voltage) with respect to the frequency (horizontal axis) of the AC voltage (that is, applied voltage). It can be seen that the resonance shear curve of the upper unit 10 is measured.

Example 2

Figure 5:
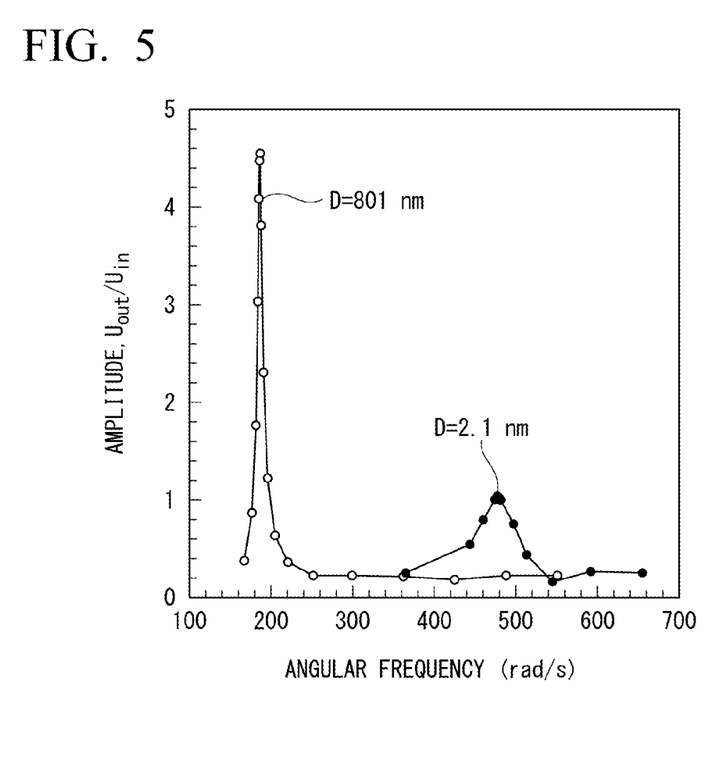
FIG. 5 is a graph showing ratio (vertical axis) of (amplitude $U_{out}$ of response voltage)/(amplitude $U_{in}$ of applied voltage) with respect to the frequency (horizontal axis) of the AC voltage (that is, applied voltage) for water between surfactant-modified mica surfaces. The measurement is performed using a resonance shear measurement device 1 having the strain gauge 19 as the displacement measurement means.

In the resonance shear measurement device 1 of the present embodiment, mica modified with dimethyldioctadecylammonium (DODA) was attached to the upper disk substrate 16 and the lower disk substrate 14, and pure water was inserted between the surfaces between the upper disk substrate 16 and the lower disk substrate 14. The response voltage from the strain gauge 19 due to the vibration of the upper unit 10 was measured by applying a sinusoidal AC voltage to the piezoelectric element 15 while changing the frequency of the AC voltage in a state where the pure water was interposed in the sample insertion portion 21. FIG. 5 is a graph showing a ratio (vertical axis) of (amplitude $U_{out}$ of response voltage)/(amplitude $U_{in}$ of applied voltage) with respect to frequency (horizontal axis) of the AC voltage (that is, applied voltage), and the measurement was performed using the resonance shear measurement device 1 having the strain gauge 19 as the displacement measurement means. When the inter-surface distance (D) is 801 nm, the viscosity of the liquid sample suppresses the vibrating movement, and the amplitude is smaller than in the case of air. That is, a peak intensity of the resonance shear curve decreases. Further, when the inter-surface distance (D) is 2.1 nm, water is excluded and DODA molecules come into direct contact with each other to cause friction, and thus, the peak frequency of the resonance shear curve shifts to a high frequency side. By changing the inter-surface distance (D) and the load (L) in this way and comparing the peak frequency and peak intensity of the resonance shear curve, changes in the viscoelasticity and friction of the liquid between the surfaces can be measured.

INDUSTRIAL APPLICABILITY

The resonance shear measurement device of the present invention can be used for applications such as viscoelasticity measurement, lubricity measurement, and friction measurement of liquid samples and liquid crystal samples, and viscoelasticity measurement of a resin.

REFERENCE SIGNS LIST

1, 3: Resonance shear measurement device
10: Upper unit
11: Lower unit
12: Lower disk holder
13: Upper disk holder
14: Lower disk substrate
15: Piezoelectric element
16: Upper disk substrate
17: Spring
18: Electric cable
19: Strain gauge
20: Capacitance probe
21: Sample insertion portion
22: Horizontal spring
23: Micro drive system
30: Fixed apparatus
40: Information processing unit

What is claimed is:

1. A resonance shear measurement device comprising:
   an upper unit having a piezoelectric element, an upper disk substrate, and a spring; and
   a lower unit having a lower disk substrate,
   wherein a sample insertion portion is formed between a lower surface of the upper disk substrate and an upper surface of the lower disk substrate,
   the piezoelectric element and the upper disk substrate are vibratably connected to a fixed apparatus via the spring,
   a strain gauge is attached to the spring, and
   a response voltage at the resonance is measured from the strain gauge due to a vibration of the upper unit by applying an AC voltage to the piezoelectric element while changing a frequency of the AC voltage.

2. The resonance shear measurement device according to claim 1, further comprising an information processing unit electrically connected to the piezoelectric element,
   wherein the strain gauge is electrically connected to the information processing unit, and the information processing unit measures the response voltage at the resonance from the strain gauge due to the vibration of the upper unit by applying the AC voltage to the piezoelectric element while changing the frequency of the AC voltage.

3. The resonance shear measurement device according to claim 1,
   wherein viscoelasticity of a sample inserted into the sample insertion portion is measured based on an amplitude of the AC voltage at the resonance and an amplitude of the response voltage at the resonance.

4. The resonance shear measurement device according to claim 3,
   wherein the viscoelasticity of the sample inserted into the sample insertion portion is measured by a physical model analysis based on a resonance shear curve obtained from the amplitude of the AC voltage and the amplitude of the response voltage with respect to the frequency.

* * * * *